United States Patent
Deno et al.

Patent Number: 5,478,468
Date of Patent: Dec. 26, 1995

[54] COAGULATING SEDIMENTATION PROCESSING APPARATUS

[75] Inventors: Masaaki Deno, Hiratsuka; Minoru Hayakawa, Saitama, both of Japan

[73] Assignee: Sumitomo Heavy Industries, Ltd., Tokyo, Japan

[21] Appl. No.: 233,439

[22] Filed: Apr. 28, 1994

[30] Foreign Application Priority Data

Sep. 10, 1993 [JP] Japan ............ 5-226162
Sep. 24, 1993 [JP] Japan ............ 5-051802 U

[51] Int. Cl.⁶ .................................. B01D 21/08
[52] U.S. Cl. .............. 210/208; 210/520; 210/528
[58] Field of Search ............................ 210/207, 208, 210/519, 520, 521, 525, 528

[56] References Cited

U.S. PATENT DOCUMENTS

| | | | |
|---|---|---|---|
| 2,263,168 | 11/1941 | Dorr et al. | 210/520 |
| 2,673,181 | 3/1954 | Hughes | 210/520 |
| 2,787,378 | 4/1957 | Battey | 210/208 |
| 3,025,966 | 3/1962 | Kivell | 210/520 |
| 3,314,547 | 4/1967 | Kivell | 210/520 |
| 3,525,439 | 8/1970 | Spragins | 210/520 |

*Primary Examiner*—Christopher Upton
*Attorney, Agent, or Firm*—Nikaido, Marmelstein, Murray & Oram

[57] ABSTRACT

A coagulating sedimentation processing apparatus comprising a sedimentation tank, a mixing chamber rotatably supported within the sedimentation tank, means for supplying suspension and additive to the mixing chamber, a mixer arranged within the mixing chamber for stirring mixed liquid of the suspension and the additive, and a plurality of distributors extending radially from the mixing chamber and provided with a plurality of jetting ports which open downwardly, wherein strip-like baffle plates are fixedly mounted respectively below the distributors so as to be opposed against the jetting ports. The mixing liquid jetted downwardly from the jetting ports of the distributor impinges against the baffle plate and is buffed so that its velocity head is reduced. Accordingly, there is no case where turbulent flow is generated by the mixing liquid which is jetted to the concentrated sludge layer which is formed in a bottom of the sedimentation tank.

1 Claim, 3 Drawing Sheets

COAGULATING SEDIMENTATION PROCESSING APPARATUS

BACKGROUND OF THE INVENTION

1. Field of the Invention

The present invention relates to a coagulating sedimentation processing apparatus for applying coagulating sedimentation processing to suspension or the like.

2. Description of the Related Art

Conventionally, water or waste water which is emitted or discharged from a waste-water plant, for example, is sent to a coagulating sedimentation processing apparatus as suspension, and coagulating sedimentation processing is applied to the water in the coagulating sedimentation processing apparatus, so that suspended material in the suspension is separated from the water.

In this case, the arrangement is such that the suspension is supplied to the sedimentation tank, additive such as inorganic coagulant, polymeric coagulant or the like is added to the suspension to form flocks, the flocks are bulked up so as to become suspended material, and the suspended material is separated from the suspension and is settled on a bottom of the sedimentation tank. For this reason, the arrangement is such that the suspension is supplied to an upper portion of a tubular mixing chamber which is arranged at a center of the sedimentation tank, additive is added to the suspension during the time in which suspension moves down within the mixing chamber, and is mixed with the suspension to form mixing liquid, and the mixing liquid flows radially outwardly from a lower end of the mixing chamber and is moved upwardly outwardly of the mixing chamber.

The flocks are bulked out at a position outward the mixing chamber, and form sludge which is sedimented downwardly. Meanwhile, cleaned processed water is moved upwardly and flows out from an overflow section.

However, the flocks which are formed in the mixing liquid are not dense, and particulate diameters of the flocks per se are different from each other. Accordingly, when uneven or non-uniform flow is generated within the sedimentation tank by flow of the mixing liquid within the mixing chamber and by wind on a surface of the sedimentation tank, the flocks having small particulate diameters are moved upwardly to a location adjacent to the liquid surface, and flow out together with the processed water from the overflow section.

In view of the above, a coagulating sedimentation processing apparatus has been proposed in which distributors are rotated within the sedimentation tank such that uneven flow is not generated in the mixing liquid which is moved upwardly outwardly of the mixing chamber, and even or uniform flow is generated within the sedimentation tank.

FIG. 2 of the attached drawings is a schematic view of the prior art or conventional coagulating sedimentation processing apparatus.

In FIG. 2, the reference numeral 11 denotes a sedimentation tank which receives therein suspension. A clean layer 11a principally consisting of processed water, a coagulated flock layer 11b mainly consisting of flocks and a concentrated sludge layer 11c mainly consisting of sludge are formed in order from a liquid level of the sedimentation tank 11 to a bottom thereof.

Further, the reference numeral 12 denotes a line for supplying the suspension; 13, a pump which is arranged in the line 12; and 15, a mixing chamber whose upper end opens. The suspension is supplied to an upper portion of the mixing chamber 15 through the line 12. The mixing chamber 15 is suspended at a center of the sedimentation tank 11, and is rotated by a drive unit 16 which is arranged at the upper end of the mixing chamber 15. A rake arm 18 is provided at a bottom of the sedimentation tank 11. The rake arm 18 is mounted on a lower end of the mixing chamber 15 and is rotated together with the mixing chamber 15.

Meanwhile, various kinds of additives, for example, inorganic coagulant, polymeric coagulant, neutralizer and the like are supplied to the upper portion and the lower portion of the mixing chamber 15 through lines 19 and 20, and are added to the suspension. In this connection, the reference numerals 21 and 22 denote pumps which are arranged respectively in the lines 19 and 20.

Moreover, a sludge discharge line 23 and a sludge returning line 24 are arranged at a bottom of the sedimentation tank 11. A part of sludge can be discharged to the outside of the system through the sludge discharge line 23. The remaining part of sludge can be returned through the sludge returning line 24, and can be supplied to the upper portion of the mixing chamber 15. In this connection, the reference numeral 25 denotes a pump which is arranged in the sludge discharge line 23; and 26, a pump which is arranged in the sludge returning line 24.

Furthermore, a mixer 31 in the form of stirring blades is suspended within the mixing chamber 15. The mixer 31 is rotatively driven by a drive unit 32 which is arranged at the upper end of the mixer 31 so that the suspension, the returned sludge and the additive within the mixing chamber 15 are mixed with each other.

A plurality of tubular distributors 35 extend radially at the lower end of the mixing chamber 15. A plurality of jetting ports 36 are formed in each of the distributors 35 so as to open downwardly. In this connection, the reference numeral 38 denotes a surface detector which is arranged within the clean layer 11a; and 39, an overflow section which is formed at an upper end of the sedimentation tank 11.

The coagulating sedimentation processing apparatus arranged as described above operates as follows:

Suspension is supplied to the mixing chamber 15 through the line 12, the additive is supplied to the mixing chamber 15 through the lines 19 and 20, and the returned sludge is supplied to the mixing chamber 15 through the sludge returning line 24. They are agitated or stirred within the mixing chamber 15 by the mixer 31 to form mixing liquid. The mixing liquid is urged radially outwardly of the distributors 35 by a centrifugal force in keeping with rotation of the mixing chamber 15, and is jetted into the coagulating flock layer 11b from the jetting ports 36.

The mixing liquid which is jetted into the coagulating flock layer 11b forms initial flocks at that time. The initial flocks move upwardly while riding the uniform flow of the mixing liquid. The initial flocks are caught or trapped within the coagulating flock layer 11b, and are formed into bulked and dense flocks.

Meanwhile, the clean processed liquid is further raised within the sedimentation tank 11 to form the clean layer 11a. Further, a part of the flocks within the coagulating flock layer 11b is moved downwardly within the sedimentation tank 11 to form sludge, to thereby form the concentrated sludge layer 11c.

Accordingly, the sludge sedimented on the bottom of the sedimentation tank 11 is condensed by the rake arm 18 which is rotated together with the mixing chamber 15. A part of the condensed sludge is discharged to the outside of the system through the sludge discharge line 23, while the remainder of the condensed sludge forms returned sludge which is again supplied to the mixing chamber 15 through the sludge returning line 24.

During this time, the surface height of the clean layer 11a and the surface height of the coagulating flock layer 11b are detected by the surface detector 38. The pump 25 is driven such that the surfaces are not placed upwardly beyond the predetermined heights, and the sludge is discharged through the sludge discharge line 23.

In this manner, the suspended material within the suspension is separated, and the cleaned processed water flows out or is discharged from the overflow section 39.

Since the aforesaid prior art coagulating sedimentation processing apparatus is arranged such that the mixing liquid is jetted downwardly from the jetting ports 36 of the distributors 35, it is possible to form a uniform flow of the mixing liquid within the sedimentation tank 11. However, turbulent flow is generated, by the jetted mixing liquid, in the concentrated sludge layer 11c within a range of from 50 [cm] to 150 [cm] from the lower end of the distributors 35.

In this case, there is a problem that a quantity of the concentrated sludge layer 11c is substantially reduced, and the concentration of the sludge is also reduced.

Moreover, in the aforementioned prior art coagulating sedimentation processing apparatus, the mixing liquid within the mixing chamber 15 is jetted into the coagulating flock layer 11b from the jetting ports 36 of the respective distributors 35. However, the initial flocks which are formed at that time are deposited within the distributors 35 and are adhered to the jetting ports 36. The sludge within the coagulation flock layer 11b is adhered to the jetting ports 36 so that the jetting ports 36 are blocked.

There is a problem that, since, in this case, the mixing liquid is jetted only from the jetting ports 36 which are not blocked, uneven or non-uniform flow is generated within the sedimentation tank 11.

SUMMARY OF THE INVENTION

Accordingly, the present invention has, as its object, provision of a coagulating sedimentation processing apparatus which, in order to solve the above-described problems of the conventional coagulating segmentation processing apparatus, is capable of forming even or uniform flow of mixing liquid within a sedimentation tank, and which does not generate turbulent flow in a condensed sludge layer by jetted mixing liquid so that sludge is easy to be concentrated.

Further, the invention has, as its another object, provision of a coagulating sedimentation processing apparatus which, in the aforesaid conventional coagulating sedimentation processing apparatus, prevents jetting ports of distributors from being blocked so that uniform flow of the mixing liquid is ensured within the sedimentation tank.

In order to achieve the above-described object, according to the invention, there is provided a coagulating sedimentation processing apparatus comprising a sedimentation tank, a mixing chamber rotatably supported within the sedimentation tank, means for supplying suspension and additive to the mixing tank, a mixer arranged within the mixing chamber for mixing and stirring the suspension and the additive supplied into the mixing chamber with each other, and distributors having respective ducts thereof which extend radially from the mixing chamber and whose respective one ends are in communication with the mixing chamber and respective other ends are blocked, each of said distributors being provided with a plurality of jetting ports which open downwardly in the duct, wherein strip-like baffle plates are fixedly mounted respectively below the distributors so as to be opposed against the jetting ports.

The coagulating sedimentation processing apparatus according to the invention is arranged such that the strip-like baffle plates are fixedly mounted respectively below the distributors so as to be opposed against the jetting ports. Accordingly, the mixing liquid jetted from the jetting ports is impinged against the baffle plate and is buffed so that its velocity head is reduced. As a result, it is eliminated that turbulent flow is generated on the concentrated sludge layer by the mixing liquid which is jetted from the jetting ports. Accordingly, there is no case where the quantity of the concentrated sludge layer is reduced. Thus, it is possible to prevent the concentration of the sludge from being reduced.

Normally, the distributors are so arranged as to be rotated within a horizontal surface or plane. Preferably, the baffle plates are so retained as to be inclined rearwardly from the horizontal plane with respect to the rotational direction of the distributors. With the arrangement, the mixing liquid which is jetted from the jetting ports and which impinges against the baffle plates can flow in a direction which is reverse to the direction of movement of the distributors. Accordingly, it is possible to further reduce occurrence of the turbulent flow of the concentrated sludge layer.

According to a further preferred embodiment of the invention, in order to achieve the other object of the invention, a cleaning-water nozzle is provided within the mixing chamber so as to be opposed against entrances of the ducts of the distributors. Thus, cleaning water is jetted into the distributors, as occasion demands. Accordingly, initial flocks are prevented from being deposited within the distributors, and the jetting ports are prevented from being blocked. As a result, there is no case where uneven or non-uniform flow is generated within the sedimentation tank.

These objects and advantages of the present invention will become further apparent from the following detailed explanation of the embodiments with reference to the attached drawings.

DETAILED DESCRIPTION OF THE PREFERRED EMBODIMENTS

Figure 1:
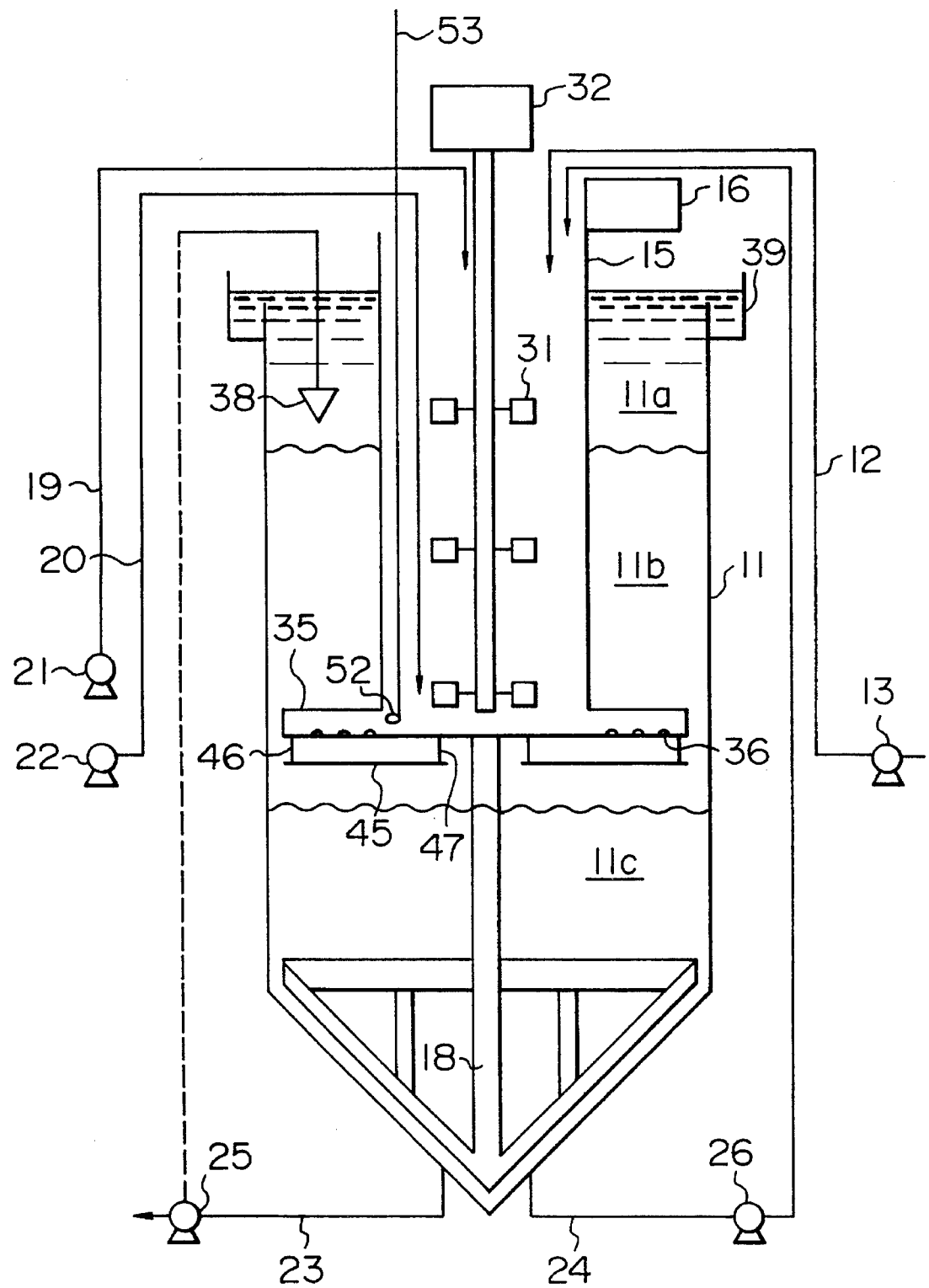
FIG. 1 is a schematic view of a preferred embodiment of a coagulating sedimentation processing apparatus according to the invention.
Figure 2:
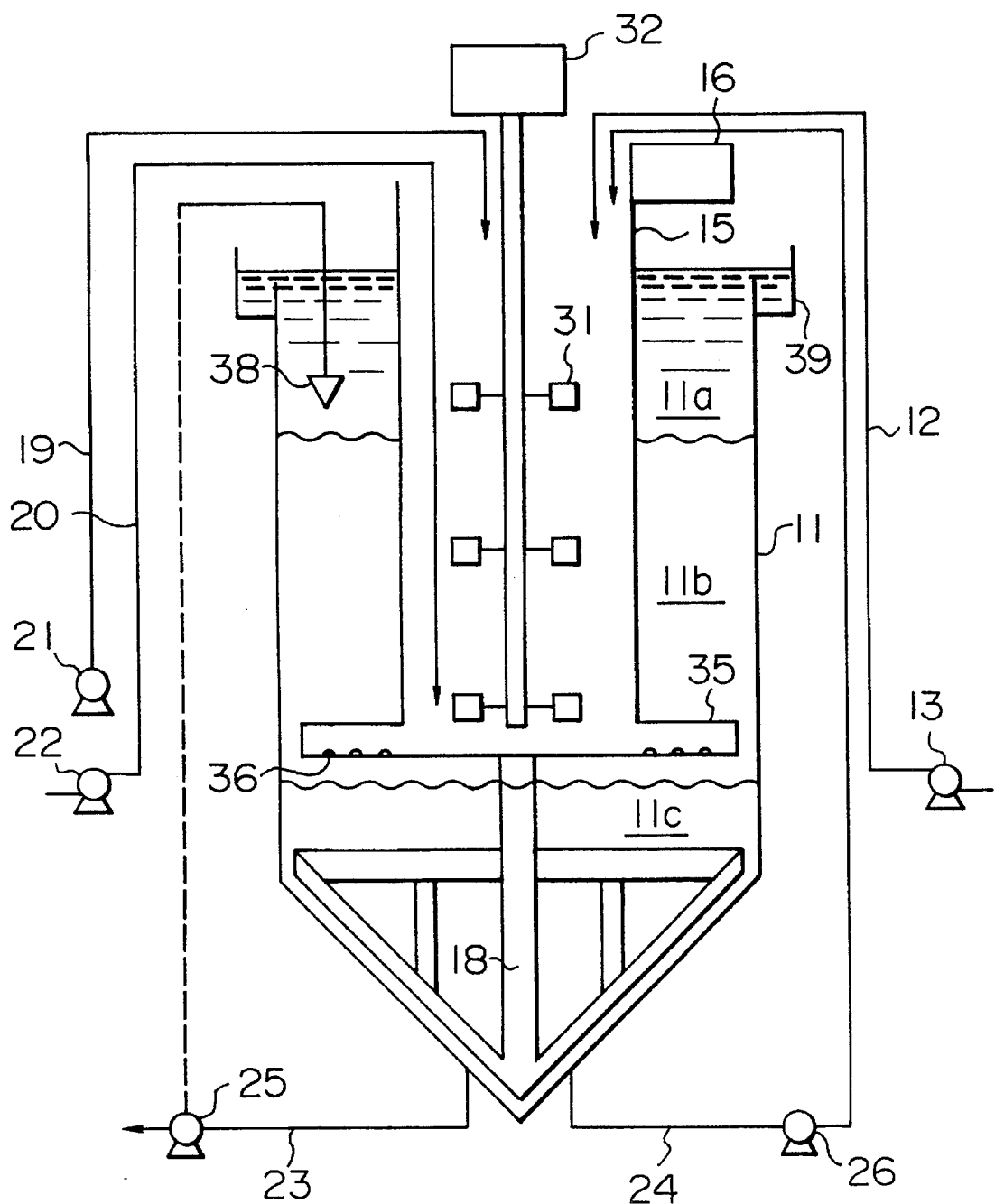
FIG. 2 is a schematic view of a conventional coagulating sedimentation processing apparatus.
Figure 3:
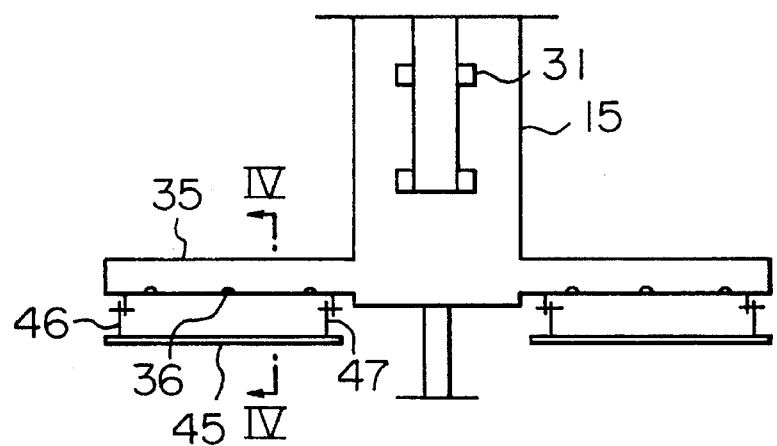
FIG. 3 is an enlarged view of a principal portion of the coagulating sedimentation processing apparatus in FIG. 1.
Figure 4:
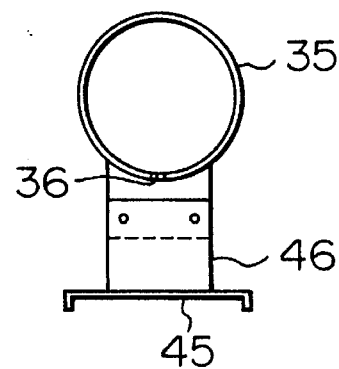
FIG. 4 is a cross-sectional view taken along a line IV—IV in FIG. 3.

FIG. 1 is a schematic view showing an embodiment of a coagulating sedimentation processing apparatus according to the invention. FIG. 3 is an enlarged view of a principal portion, and FIG. 4 is an enlarged cross-sectional view of the principal portion.

In the drawings, the reference numeral 11 denotes a sedimentation tank for receiving therein suspension. A clean layer 11a mainly consisting of processed water, a coagulating flock layer 11b mainly consisting of flocks, and a concentrated sludge layer 11c mainly consisting of sludge are formed in order from a liquid level of the sedimentation tank 11 toward a bottom thereof.

Further, the reference numeral 12 denotes a line for supplying suspension; 13, a pump arranged in the line 12; and 15, a mixing chamber whose upper end opens. The suspension is supplied to an upper portion of the mixing chamber 15 through the line 12. The mixing chamber 15 is suspended at a center of the sedimentation tank 11, and is rotated by a drive unit 16 which is arranged at an upper end of the sedimentation tank 11. Furthermore, the sedimentation tank 11 has a bottom thereof on which a rake arm 18 is arranged. The rake arm 18 is mounted on a lower end of the mixing chamber 15 and is rotated together with the mixing chamber 15.

Meanwhile, various kinds of additives, for example, inorganic coagulant, polymeric coagulant, neutralizer and the like are supplied to upper and lower portions of the mixing chamber 15 through lines 19 and 20 and are added to the suspension. In this connection, the reference numerals 21 and 22 denote pumps which are arranged respectively in the lines 19 and 20.

Further, a sludge discharge line 23 and a sludge returning line 24 are arranged in a bottom of the sedimentation tank 11. Thus, it is possible to discharge the sludge to the outside of the system through the sludge discharge line 23. The remaining sludge is returned through the sludge returning line 24, and supplied to the upper portion of the mixing chamber 15. In this connection, the reference numeral 25 denotes a pump which is arranged in the sludge discharge line 23; and 26, a pump arranged in the sludge returning line 24.

Moreover, a mixer 31 in the form of stirring blades is suspended within the mixing chamber 15. The mixer 31 is rotated by a drive unit 32 which is disposed at an upper end of the sedimentation tank 11 so that the suspension within the mixing chamber 15, the returned sludge and the additive are mixed with each other.

A plurality of tubular distributors 35 extend radially at the lower end of the mixing chamber 15. A plurality of jetting ports 36 are formed in each of the distributors 35 so as to open downwardly.

The reference numeral 38 denotes a surface detector which is arranged within the clean layer 11a; and 39, an overflow section which is formed at an upper end of the sedimentation tank 11. The arrangement as described above is the same as that of the prior art coagulating sedimentation processing apparatus.

In the invention, strip-like baffle plates 45 whose width is 10–40 (cm) are fixedly mounted respectively below the distributors 35 so as to be opposed against the jetting ports 36. Each of the baffle plates 45 has both ends thereof which are fixedly mounted on the associated distributor 35 by support pieces 46 and 47. A space of 5–50 (cm) is left between the jetting ports 36 and the baffle plate 45.

The mixing liquid which is jetted from the jetting ports 36 has a velocity head of 20–100 (cm). However, in the invention, the mixing liquid is once impinged against the baffle plate 45 without directly jetting into the concentrated sludge layer c, and is buffered so that the velocity head is reduced. Then, the mixing liquid is supplied into the concentrated sludge layer 11c. Accordingly, turbulent flow is not generated in the concentrated sludge layer 11c. Thus, there is no case where the quantity of the concentrated sludge layer 11c is reduced. As a result, it is possible to prevent the concentration of the sludge from being reduced.

Figure 5:
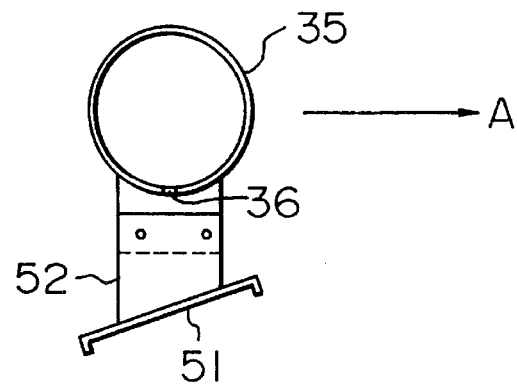
FIG. 5 is a cross-sectional view showing a modification in which a baffle plate in FIG. 4 is inclined.

The above-described embodiment is arranged such that the baffle plate 45 is so retained as to be positioned in a plane in parallel to a surface of revolution of the associated distributor 35, that is, in a horizontal plane. FIG. 5 shows a modification in which a baffle plate 51 is supported by support piece 52 so as to be inclined 0–60 degrees with respect to the horizontal plane. In this case, when the mixing chamber 15 (see FIG. 1) is rotated, and when the distributors 35 are moved in a direction indicated by an arrow A, the mixing liquid which is jetted from the jetting ports 36 and which is impinged against the baffle plate 51 flows in a direction opposite to the moving direction of the distributors 35. As a result, the turbulent flow which is generated in the concentrated sludge layer 11c is further reduced.

When the coagulating sedimentation processing apparatus arranged as described above is used for a long period of time, the initial flocks are deposited within the distributors 35, and are adhered to the jetting ports 36. Further, the sludge within the coagulating flock layer 11b is adhered to the jetting ports 36. Thus, the jetting ports 36 are blocked.

In view of the above, the aforementioned embodiment is arranged such that a cleaning-water nozzle 52 is arranged at the lower end of the mixing chamber 15 so as to be opposed against the distributors 35, and the cleaning water is jetted from the cleaning water nozzle 52 into the distributors 35 as occasion demands to clean the interior of each of the distributors 35 and each of the jetting ports 36. In this case, the cleaning water is sent to the cleaning-water nozzle 52 through a line 53, and is jetted continuously or intermittently from the cleaning nozzle 52 at the velocity of 1–10 [m/s]. Accordingly, the initial flocks are prevented from being deposited within the distributors 35, and the jetting ports 36 are washed or cleaned. Thus, the jetting ports 36 are prevented from being blocked.

The invention should not be limited to the above-mentioned embodiments, but various modifications may be made to the invention within the spirit and scope of the invention which are defined by the appended claims.

What is claimed is:

1. A coagulating sedimentation processing apparatus comprising a sedimentation tank, a mixing chamber rotatably supported within said sedimentation tank, means for supplying suspension and additive to said mixing chamber, a mixer arranged within said mixing chamber for mixing and stirring said suspension and said additive supplied into said mixing chamber, with each other, a plurality of distributors each having a duct which extends radially from said mixing chamber and which has one end thereof in communication with said mixing chamber and the other end blocked, each of said distributors being provided with a plurality of jetting ports which open downwardly, a plurality of strip-like baffle plates fixedly mounted respectively one on each of said distributors in a plane intersected by an axis of at least one of said jetting ports, and a cleaning-water nozzle provided within said mixing chamber adjacent and facing an entrance of the duct of each of said distributors.

\* \* \* \* \*